United States Patent [19]
Dahlstrom

[11] 3,799,130
[45] Mar. 26, 1974

[54] INTERNAL COMBUSTION ENGINE
[76] Inventor: Karl L. Dahlstrom, 942 Ashwood Dr., Lewisville, Tex. 75067
[22] Filed: June 21, 1971
[21] Appl. No.: 155,207

[52] U.S. Cl. .............. 123/119 A, 123/22, 123/75 C
[51] Int. Cl. ...................... F02m 25/06, F02b 41/00
[58] Field of Search................ 123/119 A, 75 C, 22

[56] References Cited
UNITED STATES PATENTS

| 1,833,802 | 11/1931 | Violet | 123/75 C |
| 2,131,384 | 9/1938 | Mauthner | 123/75 C |
| 3,583,375 | 6/1971 | Pischinger | 123/119 A |
| 3,625,189 | 12/1971 | Myers et al. | 123/119 A |

FOREIGN PATENTS OR APPLICATIONS

| 437,498 | 11/1926 | Germany | 123/75 C |
| 721,212 | 2/1930 | Italy | 123/75 C |

*Primary Examiner*—Wendell E. Burns
*Attorney, Agent, or Firm*—H. Mathews Garland

[57] ABSTRACT

An internal combustion engine including at least one cylinder and piston, a fuel intake system, an exhaust system, and particularly characterized by an exhaust gas recirculation system having a chamber communicating with the base end of the combustion chamber of the cylinder for receiving a charge of exhaust gas at the end of each power stroke and recirculating the exhaust gas charge mixed with fresh air back into the cylinder at the end of each fuel intake stroke of the piston. A valve may be placed in the flow passage communicating the cylinder with the exhaust recirculation chamber for controlling the communication responsive to cam shaft movement or to intake manifold vacuum for correlating the exhaust recirculation with the fuel-air ratio fed to the engine.

9 Claims, 6 Drawing Figures

PATENTED MAR 26 1974 3,799,130

INVENTOR
KARL L. DAHLSTROM

H. Mathew Garland
ATTORNEY

INTERNAL COMBUSTION ENGINE

This invention relates to internal combustion engines and particularly relates to an exhaust gas recirculation system for internal combustion engines.

In recent years air pollution problems, especially in the metropolitan areas of the world, have rapidly become monumental and continue to increase at such alarming rates that, if unchecked, the survival of both plant and animal life becomes more and more in question. A principal source of such air pollution is the present day internal combustion engine used in automobiles, buses, aircraft, and many other forms of both mobile and stationary apparatus. One of the main reasons for the production of pollutants by the internal combustion engine is the inefficiency of the combustion process of the engine resulting in the discharge of many unburned or partially burned products which, for the most part, are gaseous in form so that they laden the air with impurities. Many different approaches are being taken to attempt to solve the problems inherent in present engine designs for reducing the polluting gases exhausted by the engines into the atmosphere. Imrpovements in both the ignition systems and in the designs of the combustion chamber portions of such engines including alterations in fuel and exhaust systems have been and are continuing to be investigated. Among solutions which have been attempted relating to the particular field of Applicant's invention are systems for the recirculation of exhaust gases, particularly into the head ends of the engine cylinders. Such efforts have not been particularly successful for a number of reasons, including somewhat severe quantitative limitations on exhaust gas recirculation consistent with efficient engine performance. Such approaches not only affect the amount of fuel which can be introduced into the cylinder but also affect the combustion process in the cylinder and the overall operation including the ultimate power obtainable from the engine.

Conventional approaches to solutions to the problems of internal combustion engines by way of exhaust gas recirculation have involved systems which direct the exhaust gases from the exhaust manifold into the intake manifold where the exhaust gases mix with the normal fuel and air mixture drawn into the engine during the intake stroke. Such a point of energy of the recirculated exhaust gases displaces the needed fuel-air mixture, thus reducing engine performance. Different modes of engine operation require different volumes of reciruclating exhaust gas necessitating a complex system for making such adjustments in the gases recirculated. The exhaust gases must be cooled to avoid overheating the manifold which causes carburetion producing fuel percolation and vapor lock. The maximum volume of recirculated exhaust gas or the ratio of the recirculated exhaust gases to the fuel-air mixture is limited by the physical size of the intake manifold system of the engine and also by the amount of decrease in engine performance which can be tolerated. Insofar as is presently known, the recirculation of exhaust gases through the intake manifold route limits the amount of recirculated gases to about 15 percent of the total volume of gases introduced into the combustion chamber through the intake system. Recirculating in excess of the 15 percent level by this procedure results in many problems including engine surging and tremendous power losses. The surging may produce engine heistations, generally erratic performance of the engine, non-responsiveness to accelerator operation, or uncontrollable response by the engine. In extreme cases of exceeding the 15 percent limit believed to be inherent in recirculating to the head end of the cylinder, the engine will not run at all. It is well known that these forms of improper engine functioning seriously reduce the power output of the engine in addition to being damaging to the structure of the engine. The present practice produces a fuel mixture leaning effect which causes spark plug burnout because the leaning of the mixture is achieved at the head end of the cylinder in the vicinity of the spark plug. Overheating which is inherent in the leaning of the fuel-air mixture additionally may produce pre-ignition detonation problems. Present exhaust emission standards established by the United States Government are not believed attainable by present recirculation practices but are believed achievable with the present invention. For these and other reasons, it is believed that efforts to improve the combustion process by the gas recirculation method do not promise to produce acceptable results if based on present approaches.

It is, therefore, a principal object of the invention to provide a new and improved system for the recirculation of exhaust gases to the combustion chamber of the cylinder of an internal combustion engine.

In accordance with the invention, an internal combustion engine of generally conventional design with respect to its ignition, fuel, and exhaust system includes an exhaust recirculation chamber communicating with the combustion chamber of the engine at a location in the cylinder near the base end of the stroke of the piston so that a portion of the exhaust gases in the combustion chamber are discharged from the combustion chamber into the exhaust recirculation chamber at the end of the power stroke and are re-introduced into the combustion chamber at the end of the fuel intake stroke and during the beginning of the compression stroke. Means are provided for mixing fresh air with the recirculating exhaust gases in the exhaust recirculation chambe prior to reintroduction of the exhaust gases into the combustion chamber. The exhasut gas reciriclation system may include a valve driven by the cam shaft for selectively opening and closing the exhaust recirculation gas chamber in a timed sequence with the piston movement. Another form of valve controlling communication between the combustion chamber and the exhaust gas recirculation chamber may be connected with the intake manifold for correlating the function the the recirculation system with engine demands so that during period of high demand with rich fuel requirements, greater volumes of exhaust gases are recirculated than during periods of low engine demands.

The foregoing objects and advantages of the invention will be more readily apparent from reading the following detailed description of the invention taken in conjunction with the accompanying drawings wherein.

Figure 1:
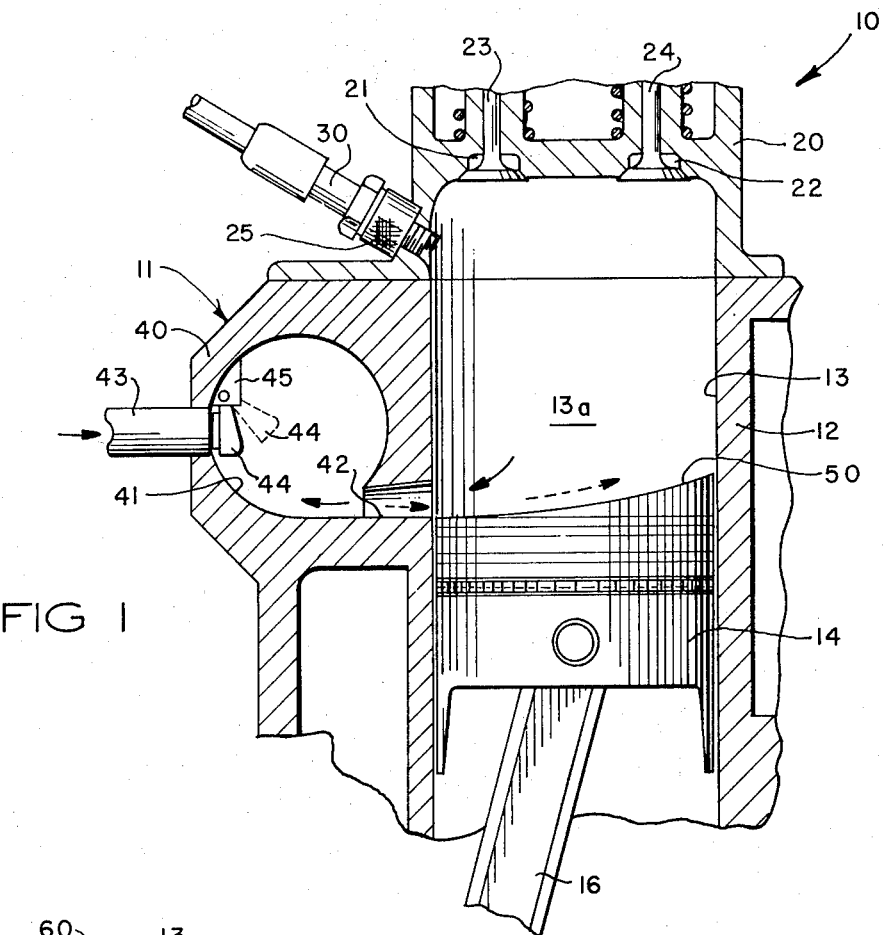
FIG. 1 is a diagrammatic fragmentary view in section of a cylinder and piston with related structure of an engine including an exhaust gas recirculation system embodying the present invention.

Referring particularly to FIG. 1 of the drawings, an internal combustion engine 10 includes an exhaust gas recirculation system 11 embodying the features of the invention. The engine has a block 12 provided with a cylinder 13 in which a piston 14 is longitudinally slidable defining a combustion chamber 13a. The piston is secured by a pin 15 to a connecting rod 16. The cylinder 13 is closed by a head 20 provided with a fuel intake passage 21 and an exhaust passage 22. Supply of fuel including a mixture of air and gasoline, or such other combustible fluid as may be desired, is controlled by an intake valve 23 while exhsust discharge from the cylinder through the passage 22 is controlled by an exhaust valve 24. The engine is provided with a spark plug 25 connected with an electrical lead 30. The systems of the engine including the ignition having a distributor connected to the lead 30 to the spark plug 25, the actuators for the intake and exhaust valves 23 and 24, respectively, the cooling system, and other features such as the crank shaft and related structure of the engine are of suitable conventional design and, thus, for simplicity of illustrarion, are not shown in drawings and wil not be described in detail.

In accordance with the invention, the exhaust recirculation system includes a housing 40 formed integral with the engine block, or secured to the block, provided with an exhaust recirculation chamber 41 which communicates through a port 42 into the combustion chamber 13a of the cylinder toward the base end of the cylinder at a location at which it is uncovered by the piston 14 as the piston reaches the inward end of its stroke. The exhaust recirculation chamber communicates through a conduit 43 with the atmosphere, or with another suitable source of fresh air, not shown. A valve 44 pivotally supported from a bracket 45 controls flow between the conduit 43 and the chamber 41. The valve 44 is normally closed and is opened responsive to a pressure in the exhaust recirculation chamber 41 lower than the pressure within the conduit 43.

Figure 6:
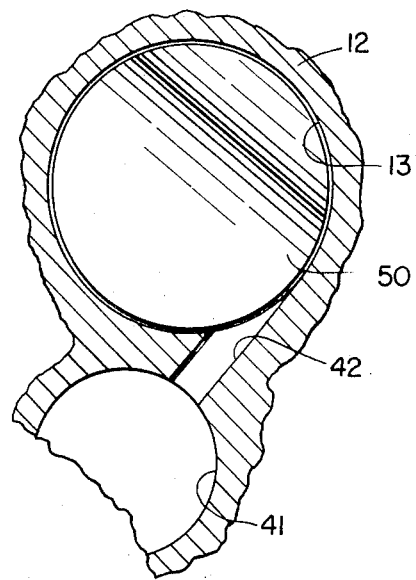
FIG. 6 is a fragmentary view in section illustrating an alternative arrangement of the port between the exhaust gas recirculation chamber and the cylinder showing the port entering the cylinder tangentially.

While not essential to the operation of an engine with the exhaust gas recirculating system of the invention, it is preferred that the flow passage or port 42 between the combustion chamber 13a and the exhaust recirculation chamber 41 enter the combustion chamber tangentially to provide a swirling action to the gases recirculated to the combustion chamber from the exhaust recirculation chamber. A tangentially entry of the port 42 into the combustion chamber 13 is illustrated in FIG. 6. It will be evident that the gas recirculated to the combustion chamber will pass from the exhaust recirculation chamber 41 through the port 42 entering the combustion chamber 13 along the side wall of the chamber so that the gases will achieve a swirling action within the combustion chamber. To further facilitate the recirculation of the gases back into the combustion chamber, the head end of the piston is provided with a concave face 50 sloping twoard the exhaust recirculation chamber port 42. If desired, the piston head 50 may be further contoured to provide a somewhat spiral shaped head surface for additionally inducing a spinning mixing action in the entering recirculating exhaust gases. FIG. 1 is illustrative of only a single cylinder of an internal combustion engine constructed in accordance with the invention, it being understood that each of the cylinders of the engine, whether it be a single or a multiple cylinder engine, is so equipped.

The fuel employed, the operation of the ignition system, and the intake, power, and exhaust stroke sequence of the engine 10 are conventional for a standard, well-known, four-cycle type of engine. During the operation of the engine, an air-fuel mixture is drawn into the engine through the intake passage 21 past an open intake valve 23, is compressed, and is ignited by means of the spark plug 25. As the piston 14 moves donwardly through the power stroke, the pressure of the burning expanding fuel-air mixture in the combustion chamber 13a of the cylinder 13 greatly exceeds the pressure within the exhaust recirculation chamber 41. When the piston uncovers the port 42 leading to the exhaust recirculation chamber 41, the much greater pressure in the combustion chamber forces burning exhaust gases through the port into the exhaust recirculation chamber. The slope of the piston head surface 50, together with the position and alignment of the port 42 relative to the chambers, creates a substantial amount of turbulence in the exhaust gases being discharged from the combustion chamber into the exhaust recirculation chamber. The exhaust gases entering the chamber 41 mix with the air within the chamber. The pressure within the exhaust recirculation chamber greatly exceeds the pressure within the air conduit 43 to the chamber, thereby holding the valve 44 seated at a closed position. The chamber 41 remains in communication through the port 42 with the combustion chamber from the time that the piston 14 first uncovers the port 42 during the lower end portion of the piston travel during the power stroke until the piston moves back upwardly above the port during the beginning of the exhaust stroke.

The exhaust gases are discharged from the combustion chamber through the port 42 into the chamber 41 at a substantial pressure at which the gases remains after the piston again covers the port during the beginning of the exhaust cycle of the piston. Of course, as the piston starts upwardly on the exhaust stroke, the exhaust valve 24 opens in a conventional manner to discharge from the combustion chamber 13a that remaining portion of the exhaust gases which was not discharged from the combustion chamber into the exhaust chamber 41.

The piston 14 moves upwardly through the exhaust stroke at the end of which the exhaust valve 24 closes and the intake valve 23 opens to admit the fuel-air mixture past the valve from the passage 21 into the head end of the combustion chamber 13a. The piston moves downwardly through the fuel intake stroke again uncovering the port 42 leading to the exhaust recirculation chamber near the lower end of the piston intake stroke. The downward movement of the piston creates a partial vacuum within the combustion chamber which is at a pressure less than the pressure within the exhaust recirculation chamber 41. The exhaust gases had, of course, been discharged from the combustion chamber into the exhaust recirculation chamber under high pressure at the end of the firing stroke of the piston. When the piston uncovers the port 42 during the intake stroke, the greater pressure of the exhaust gas and air mixture in the chamber 41 forces the mixture into the combustion chamber above the piston head through the port 42. The piston continues its intake stroke at the end of which it reverses beginning the compression stroke. During the entire time that the piston uncovers the port 42, the mixture of exhaust gas and air tend to flow from the exhaust recirculation chamber into the combustion chamber.

During the period of time that the exhaust gases and air occupied the chamber 41 since the last cycle, the exhasut gases are cooled so that a substantially cooler mixture re-enters the combustion chamber when the port 42 is uncovered by the piston during the intake stroke. As the exhaust gas-air mixture is entering the combustion chamber through the port 42, a fresh charge of air enters the chamber 41 through the conduit 43 past the valve 44. This fresh charge of air enters the exhaust recirculation chamber until the pressure within the chamber reaches ambient atmospheric pressure. This fresh charge of air will mix with and aid in cooling the next charge of exhaust gas discharged from the combustion chamber into the exhaust recirculation chamber during the next cycle of the engine. The amount of exhaust gas re-entering the combustion chamber is effectively automatically regulated for each stroke at each individual cylinder, being directly proportional to the combustion pressure in the chamber 13a during the previous power stroke. During the intake stroke, at the time that the piston uncovers the port to the exhaust recirculation chamber, a normal full charge of fresh air and fuel mixture has been drawn into the combustion chamber with the charge of recirculating exhaust gas and fresh air being forced into the combustion chamber by the higher pressure in the exhaust recirculating chamber effectively supercharging the mixture in the combustion. The normal fuel-air mixture intake is not rendered or displaced by the recirculated charge.

An instantaneous analysis of the contents of the combustion chamber immediately after the supercharging of the recirculated exhaust gas-air mixture back into the combustion chamber presents a charge for the combustion stroke which is in effect a leaner gas-air ratio. In effect, a two-stage induction of air is brought about with the first stage comprising the normal introduction of air through the intake valve which may involve the input of air and fuel in a ratio of about 13:1. The second stage of air introduction comes, of course, at the end of the intake stroke when the mixture of air and recirculated cooled exhaust gas is introduced into the combustion chamber at a supercharged pressure from the exhaust recirculation chamber. This produces a charge in the combustion chamber which ranges from a fuel rich mixture in the vicinity of the spark plug to a fuel lean charge toward the combustion chamber surfaces effecting a continuous smooth combustion burn which quickly progressively changes from rich to lean.

The temperature in the combustion chamber is reduced from the previous peak level of a conventional engine as much as 800° K., which drastically inhibits instantaneous combustion thereby performing the same function as lead in present high octane gasolines. The probability of detonation is reduced by virtue of the inhibiting effect of the re-introduction of the exhaust gas into the combustion chamber providing a barrier of exhaust gas on the combustion chamber surfaces which reduces the pressure wave of the advancing flamed front before it reaches the top surface of the piston. Thus, in the rich-to-lean mixture in the combustion chamber the resulting progressively reducing pressure of the flamed front provides the desired overall expansion effect wtihout confronting the combustion chamber surfaces with the maximum pressure wave of a combustion mixture. The net overall result is to provide a lean air-fuel ratio without the detrimental results of an extremely lean ratio in the vicinity of the spark plug causing spark plug burning, engine overheating, and the like. Such a lean air-fuel ratio reduces hydrocarbons (HC) and carbon monoxide (CO) without a corresponding increase in oxides of nitrogen ($NO_x$) and heat.

Exhaust gas recirculation has proven, even in the less efficient systems of the prior art, to be an effective means to inhibit gasoline combustion reactions, thus reducing heat and nitrogen emissions. Thus, the reduction of the nitrous oxides and the heat is achieved in the present invention without slowng down the flame front speed and without thereby decreasing performance. The use of the cooled exhaust gas and air mixture inhibits the spontaneous ignition of fuel due to heat and pressure, thereby permitting low octane gas usage in a high compression engine without the need for gasoline additives.

A principal source of hydrocarbons and thereby hydrocarbon discharge from conventional engines is found to be in stagnant gases left on the combustion chamber and piston surfaces and also the quenching of the flame near these surfaces during combustion. Such quenching inhibits thorough burning of the fuel leaving unburned hydrocarbons to be exhausted to the atmosphere. The introduction of air and warmer exhaust gas at approximately 350° F. activates the stagnant gases and makes it unnecessary for the flame to reach the surface of the combustion chamber for complete combustion. The turbulence created by the recirculation of the exhaust gases and air into the combustion chamber tends to break up the stratification of stagnant gases along the surfaces of the chamber and the piston head. Beneficial effects are found during the warming-up of an engine which generally is a peak period of exhaust emission because more complete combustion occurs due to more effective mixing and less quenching on cold cylinder walls.

An especially novel and highly beneficial feature of the invention is the recirculation of the exhaust gases with fresh air without affecting the normal charging of the engine with the necessary fuel-air mixture for combustion. As previously pointed out, at the time that the piston reaches the point in the intake stroke that it begins to uncover the port 42 into the exhaust recirculation chamber 41, the full normal charge of fuel and air has been drawn into the combustion chamber through the intake system. This is to be contrasted with the previous approach to exhaust gas recirculation wherein the gases were injected into the intake manifold thereby displacing some of the normal charge of fuel and air to the combustion chamber and also producing a leaning effect in the vicinity of the spark plug. As previously discussed, the maximum quantity of recirculated exhaust gas which has been capable of being tolerated in the past through injection into the intake system has been about 15 percent of the exhaust gas, while it has been found with the present invention, by injecting the air and exhaust gas mixture at the end of the intake stroke, that as much as 25 percent of the exhaust gas may be recirculated to the combustion chamber. The normal space limitations of the structure of the intake system of an engine has no effect upon an engine having the present recirculation system as it is independent of the intake system. The increase to at least 25 percent by volume of recirculated exhaust gas provides substantial reduction in temperature without a commensurate decrease in performance as the same initial volume of fuel and air for combustion is still in the combustion chamber in a much denser atmosphere so that there is no decrease in engine performance by way of reducing power output. By reducing the peak temperatures in the combustion process, the oxides of nitrogen which are major pollutants are reduced and the adding of air produces a leaner mixture which reduces the hydrocarbon and the carbon monoxide output from the engine. In the prior practice, where there was a decrease in engine power output, for example by about 10 percent, the present invention by not replacing the normal fuel intake with recirculated gases gets an increase in power with a possible total net of 20 percent over prior practices. The cooling effect inherent in the reintroduction of the exhaust gases and air in the present invention minimizes and often eliminates pre-ignition and over-heating problems with the added benefit of reduction of pollutant exhaust. It is believed that a possible increase in the volumetric re-injection might be raised to the 30 percent level, while even at the 25 percent level the emission standards set out by the United States Government for 1975 are achievable with the present invention.

Figure 4:
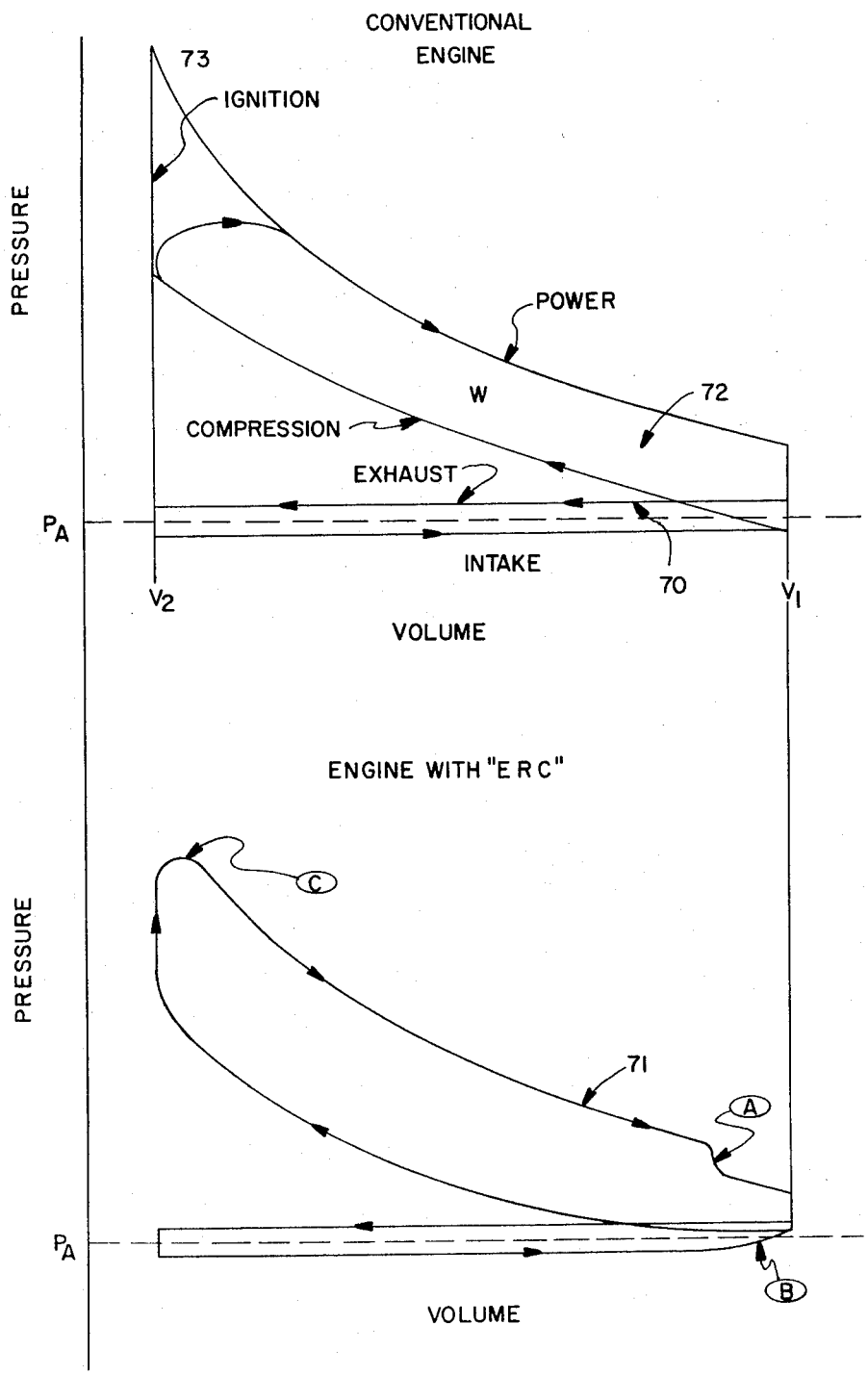
FIG. 4 shows graphs illustrating and comparing the work performed by a conventional engine and one equipped with the prewent invention presented in terms of the pressure-volume relationship of the operation of the two engines.

Referring to FIG. 4, the upper graph 70 illustrates both the actual and ideal theoretical operation of a conventional engine, while the total lower graph 71 demonstrates some of the beneficial effects of an engine equipped with the present invention. The shaded area 72 shown in the upper graph for the conventional engine illustrates actual operation of the engine, while the upper shaded area 73 shows the added benefit of a theoretical ideal operation of the engine. The explosion of the gasoline should cause the pressure to increase before a decrease in volume occurs. As a practical matter, however, the explosion takes place slowly reducing the total area enclosed by the curves thereby reducing the actual work output of the engine. While the addition of the port communicating the combustion chamber with the exhaust recirculation chamber results in some loss of pressure, as represented by the reduction in work area along the lower 71 curve at point A and at point B, the more instantaneous explosion of the gasoline mixture at the correct time tends to raise the work curve to the point C to which the pressure rises more sharply, thereby producing a net increase of the work output of the engine in the upper portions of the curve as distinguished from the work shown by the shaded area in the graph for the conventional engine.

Figure 2:
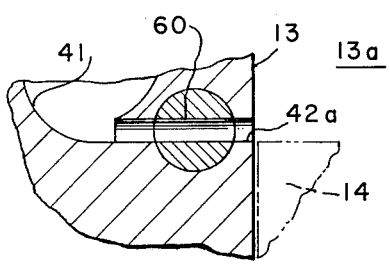
FIG. 2 is a fragmentary schematic view in section of one form of valve arrangement for controlling communication between the cylinder and the exhaust gas recirculation chamber.

FIG. 2 illustrates diagrammatically a modification to the exhuast gas recirculation system for positive control of flow between the exhaust recirculation chamber and the combustion chamber. A port or passage 42a connects the combustion chamber 13a with the exhaust recirculation chamber 41 through a rotatable valve 60 which is suitably operably interconnected with the cam shaft of the engine, not shown, and timed to remain open during the periods beginning when the piston 14 first uncovers the port 42a at the end of the power stroke and re-covers the port at the beginning of the exhaust stroke and also from when the piston first uncovers the port toward the end of the intake stroke and re-covers the port at the beginning of the compression stroke. At all other times the valve 60 remains closed to preclude any leakage between the cylinder and the exhaust recirculation chamber during those times when open communication between the two chambers is desired.

Figure 3:
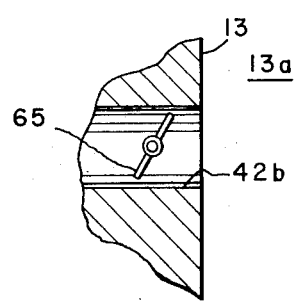
FIG. 3 is a fragmentary view in section of another form of control valve between the cylinder and the exhaust gas recirculation chamber.

A still further form of control between the cylinder and the exhaust recirculation chamber is represented in FIG. 3 which shows a modified port or passage 42a between the chambers in which is disposed a rotatable valve 65 which is connected by a suitable linkage, not shown, to a vacuum unit at the intake manifold or a linkage to the throttle whereby the valve is adapted to open to provide increased communication chamber to chamber during periods of lower vacuum in the intake manifold. By so controlling the communication between the combustion chamber and the exhaust recirculation chamber, the interaction between the chambers is increased at those times when the vacuum is lower in the intake manifold, such as when leaner mixtures are being introduced into the engine for acceleration, for warm-up, and like periods.

A still further modification which may be incorporated in the exhaust gas recirculation system 11 is the inclusion of a forced draft form of air supply such as a pump, not shown, connected with the fresh air conduit 43 into the exhaust recirculation chamber 41 for increasing the quantity of air introduced into the chamber and mixed with the recirculating exhaust gases.

Figure 5:
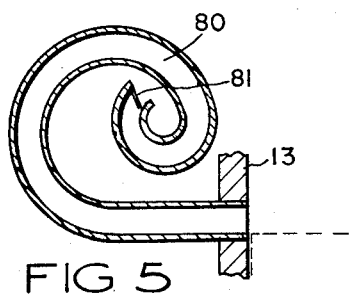
FIG. 5 is a fragmentary view in section of a portion of a cylinder and exhaust recirculation chamber adapted to an air-cooled engine.

The engine represented in FIG. 1 is of the conventional water-cooled type though it is to be understood that the invention is equally applicable to air-cooled engines. FIG. 5 represents a form of modification to an air-cooled engine to accommodate it to the recirculation system of the present invention. A tube 80, preferably coiled, is connected into the combustion chamber through a side port 42c corresponding to the port 42 for communication with the chamber when the piston uncovers the port. The tube 80 defines the exhaust gas recirculation chamber into which the exhaust gas is discharged during the operation of the engine as previously discussed. The free end of the tube is provided with a valve 81 corresponding to the valve 44 of FIG. 1 for admission of fresh air to the tube chamber at the correct step in the operation of the engine, as previously explained. The purpose of utilizing the tube is to provide a maximum of cooling surface for the chamber so that the exhaust gas in the tube and fresh air drawn into the tube are cooled prior to re-admission into the combustion chamber.

While not illustrated specifically in the drawings, it will be recognized that conduit means may be provided for recirculating exhaust gas from the main exhaust discharge passage 22 into the recirculation chamber and subsequently admitting the recirculated exhaust gas into the combustion chamber through the ports illustrated at the end of the intake stroke in the same manner as previously discussed. Such a procedural and structural modification constitutes a variation from the illustrated form only in the sense of recirculating from the exhaust manifold to the recirculation chamber, as distinguished from discharging a portion of the exhaust directly into the chamber at the end of the power stroke, with theremaining steps being the same as discussed before with the exhaust gases recirculated from the exhaust manifold being introduced into the combustion chamber with fresh air at the end of the intake stroke of the piston.

While the structure and methods illustrated and discussed have been presented in terms of the engine being a conventional gasoline-type engine having a spark plug for ignition, it will be readily apparent that the structure and methods of the invention are equally applicable to a diesel engine with the structure of the engine, particularly concerning the exhaust recirculation system, being identical to that illustrated so that the diesel exhaust is discharged into the recirculation chamber and re-injected into the chamber at the end of the fuel intake stroke.

Thus, it will be seen that there has been described and illustrated a new and improved system for use with an internal combustion engine for recirculating exhaust gases mixed with fresh air into the combustion chamber of an engine at the end of each intake stroke for improving engine performance while reducing exhaust of undesirable pollutants from the engine. The new and improved engine may be produced by relatively simple modification to the design of existing engines inasmuch as the changes necessary are basically only in the block while changes are not necessary in the other components of the engines.

The recirculation of the exhaust gases and air in the manner of the present invention results in leaner air-gas ratios producing lower CO emissions without engine overheating and preignition. Stagnant gases left on combustion chamber surfaces are substantially eliminted so that the movement of the flame front is not quenched as in the past. More complete combustion is provided reducing hydrocarbon emissions and reducing the possibilities of detonation without slowing down the actual fame front speed orrate of propagation. The lower emissions are maintained in part because the combustion chamber stays cleaner and is free of carbon deposit build-ups and contaminates. The nitrous oxide emissions are below any known present levels and are without the required 1975 U. S. Government standards. Low-octane, low-led gasolines are usable without commensuarate reduction of compression ratios.

What is claimed and desired to be secured by Letters Patent is:

1. An internal combustion engine comprising: a cylinder; a piston movable in said cylinder, said piston and said cylinder defining a combustion chamber for combustion of a fuel mixture for driving said piston; a fuel supply system for introducing a fuel-air charge into said combustion chamber; an exhaust system for discharging products of combustion from said combustion chamber; means for recirculating a portion of said products of combustion from said combustion chamber back into said combustion chamber at substantially the end of the fuel intake stroke of said piston; and means for mixing fresh air with said recirculating products of combustion before said products of combustion are recirculated into said combustion chamber.

2. An internal combustion engine comprising: A cylinder; a piston movable in said cylinder, said piston and said cylinder defining a combustion chamber for combustion of a fuel mixture for driving said piston; a fuel supply system for introducing a fuel-air charge into said combustion chamber; an exhaust system for discharging products of combustion from said combustion chamber; means providing a recirculation chamber and a port communicating said chamber with said combustion chamber when said piston is substantially at the end of each power stroke and when said piston is substantially at the end of each fuel intake stroke; and means for introducing fresh air into said products of combustion in said recirculation chamber before said products are recirculated back to said combustion chamber.

3. An internal combustion engine in accordance with claim 2, wherein said piston is provided with a contoured head surface having a surface portion sloping toward said port.

4. An internal combustion engine in accordance with claim 2 including valve means associated with said port between said combustion chamber and said recirculation chamber for communicating said chambers at substantially the end of each power stroke of both said piston and at the end of each fuel intake stroke of said piston and for isolating said chambers at all other times during the operation of said engine.

5. In an internal combustion engine having a cylinder, a piston slidable in said cylinder and defining a combustion chamber therewith, a fuel intake system communicating with said combustion chamber, an exhaust system communicating said combustion chamber, the improvement which comprises: means providing an exhaust recirculation chamber for receiving a portion of the products of combustion exhausted from said combustion chamber and recirculating said portion of said products of combustion back to said combustion chamber; means providing a port communicating said combustion chamber with said exhaust recirculation chamber at a location in said cylinder opening into said combustion chamber at a position at which said port is uncovered by said piston along the terminal portion of each power stroke of said piston for discharging a portion of said products of combustion in said combustion chamber from said combustion chamber into said exhaust recirculation chamber, said port being also uncovered by said piston for communication between said chambers along the terminal portion of each fuel intake stroke of said piston for recirculating said portion of said products of combustion from said exhaust recirculation chamber back into said combustion chamber during said terminal portion of said fuel intake stroke and at the beginning portion of the compression stroke of said piston; air passage means providing communication between said exhaust recirculation chamber and the atmosphere around said engine for introducing fresh air into said exhaust recirculation chamber during the terminal portion of the fuel intake stroke of said piston; and valve means associated with said air passage means for admitting air to said exhaust recirculation chamber when the pressure in said chamber is below ambient pressure around said chamber and for closing said air passage when the pressure within said exhaust recirculation chamber exceeds the ambient pressure around said chamber.

6. An internal combustion engine in accordance with claim 5 wherein said piston has a contoured head end face providing a surface sloping toward said port between said combustion chamber and said exhaust recirculation chamber.

7. An internal combustion engine in accordance with claim 5 wherein said head end of said piston is shaped to provide swirling action to the products of combustion and air recirculated to said combustion chamber from said exhaust recirculation chamber.

8. An internal combustion engine in accordance with claim 5 wherein said port opens to said combustion chamber tangentially for optimizing the mixing of said air and products of combustion recirculating to said combustion chamber.

9. A method of operating an internal combustion engine comprising the steps of: introducing a charge of a fuel-air mixture into the combustion chamber of said engine through the fuel intake system of said engine; igniting said mixture in said combustion chamber for driving the piston of said engine through a power stroke; withdrawing a first portion of the products of combustion from said combustion chamber along the end portion of said power stroke of said piston at the piston end of said combustion chamber; mixing air with said first portion of said combustion products withdrawn from said combustion chamber moving said piston through an exhaust stroke for discharging the remaining portion of said products of combustion from said cylinder through an exhaust system of said engine; moving said piston through an intake stroke for drawing another fuel-air charge into said combustion chamber; recirculating the mixture of said air and said first portion of said products for combustion back to said combustion chamber at the piston end thereof along the end portion of said intake stroke of said piston; compressing said fuel-air charge and said mixture of said air and said recirculated products of combustion in said combustion chamber igniting the mixture of said fuel-air charge and said mixture of said air and said recirculated products of combustion in said combustion chamber for driving said piston through a power stroke; and sequentially repeating said steps of an intake, an exhaust, a compression, and a power stroke including the steps of withdrawing said first portion of said products of combustion along said end portion of said power stroke, mixing air with said first portion of said products of combustion, and recirculating said mixture of said air and said first portion of said products of combustion to said combustion chamber along said end portion of said intake stroke.

* * * * *